Sept. 9, 1952  H. L. COLEMAN  2,609,687
ADJUSTABLE LIQUID GAUGE
Filed Aug. 3, 1949
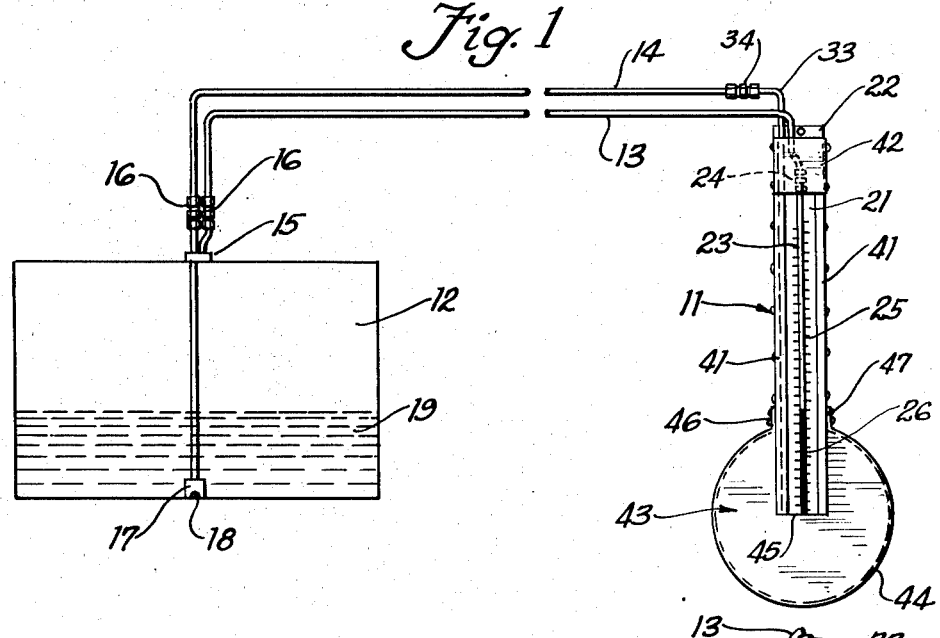
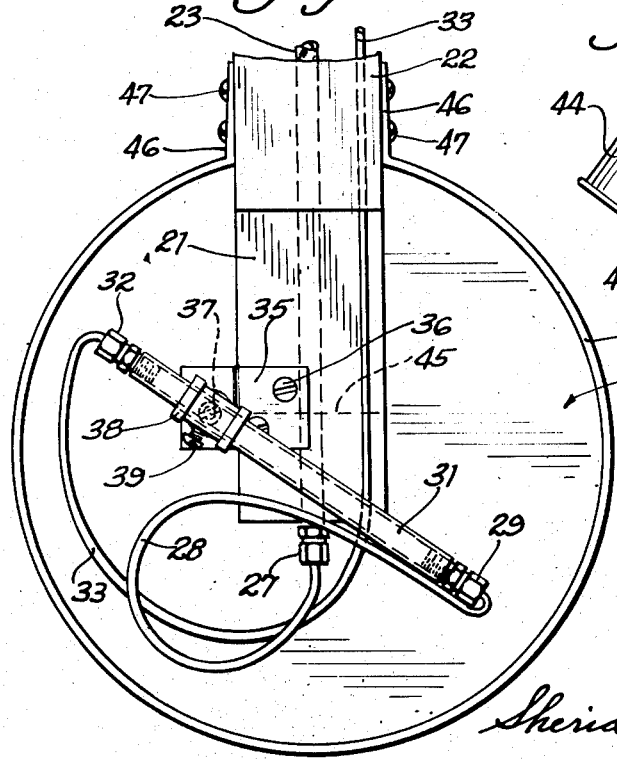
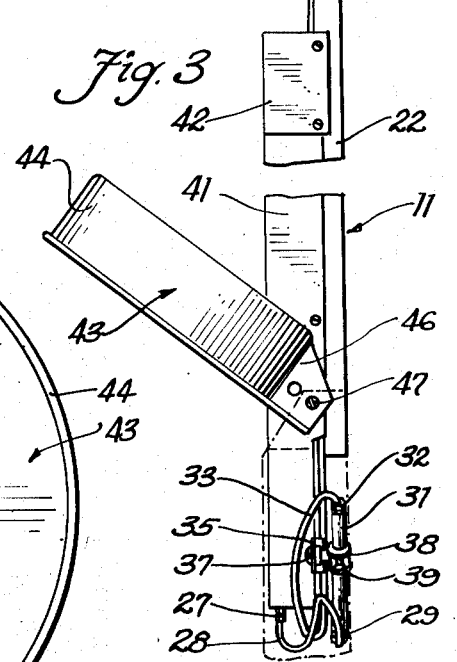
INVENTOR.
Harry L. Coleman
BY
Sheridan, Davis & Cargill
Attys Patented Sept. 9, 1952

2,609,687

UNITED STATES PATENT OFFICE 2,609,687

ADJUSTABLE LIQUID GAUGE

Harry L. Coleman, Chicago, Ill.

Application August 3, 1949, Serial No. 108,367

4 Claims. (Cl. 73—299)

This invention relates in general to liquid gauges, and more particularly to novel improvements in gauges of the manometer type adapted to render the same readily adjustable to meet varying conditions of use.

In U. S. Letters Patent No. 2,121,743, issued June 21, 1938, a liquid gauge is disclosed which comprises generally a U-shaped tube containing a measuring liquid and having suitable indicia associated therewith to indicate the height of the liquid in one leg of the tube, together with conduit means interconnecting each leg of the tube, respectively, with the top and bottom portions of a tank containing liquid. The quantity or depth of the liquid in the tank at any time is thus indicated at the U-shaped tube, at a point remote from the tank, since the surfaces of the measuring liquid in the two legs of the U-shaped tube are subjected to pressures differing from each other by the head of liquid in the tank.

It has been found in installing such liquid gauges that variations encountered in different installations require different quantities of the measuring liquid to be employed in the U-shaped indicator tube in order to position the indicating surface of the liquid properly relative to the gauge indicia. One variable thus encountered is the density of the liquid to be gauged, since although the same gauge may be employed to indicate the quantity of different liquids of different specific gravities in a tank at different times, a heavier liquid will displace the measuring fluid in the U-shaped tube a greater distance than the same quantity of a lighter liquid. Thus, while a standard or average quantity of measuring liquid is placed in the U-shaped gauge tube by the manufacturer, it may be necessary to add thereto or subtract therefrom different amounts of the measuring liquid in different installations. This is a laborious and annoying job.

A principle of the instant invention, therefore, is to provide such a liquid gauge with means that are readily adjustable to variably position the indicating surface of the measuring liquid relative to the indicating indicia to meet varying conditions of use, without requiring any alteration in the quantity of measuring liquid in the gauge.

Another object of the invention is to improve the appearance of such a liquid gauge and to enable such adjustments to be made after the same has been installed and the indicator unit mounted in its final position of use.

More specifically, the present invention contemplates the substitution for the U-shaped tube illustrated in Patent No. 2,121,743 of an indicator unit comprising a glass tube connectable at its upper end with the top portion of a tank whose liquid contents are to be gauged, a measuring fluid conatiner connected at its lower end by an intermediate conduit to the lower end of the glass tube and connectable at its upper end to the lower portion of the tank, and means for adjustably mounting such container to enable limited adjusting movements thereof relative to the glass tube to selectively vary the position assumed by the indicating surface of the measuring fluid in the glass tube.

Another object of the invention is to mount such measuring fluid container in a supporting member for adjustable longitudinal sliding movements, and to mount the supporting member for adjustable pivotal movements on an axis normal to the longitudinal axis of the container.

A further object is to simplify the adaptation of such a liquid gauge for measuring different liquids of different specific gravities by initially filling the indicating tube, intermediate conduit and adjustable container with measuring liquid in such quantity as to bring the surface thereof in the tube coincident with the zero or lowermost indicia associated with the tube and the surface thereof in the container coincident with the pivotal axis of the adjustable container-supporting member, when the container is disposed in an intermediate, normal position, whereby longitudinal sliding adjustment of the container will compensate for the different specific gravities of different liquids to be gauged.

Another object is to provide novel means for masking and normally preventing access to the adjustable container, one part of which is pivotally mounted for release and movement to an inoperative position when it is desired to adjust the position of the container.

A further object of the invention is to form one wall of the pivotally movable part of such masking means with a cut away portion defining a horizontally disposed edge, when this part is in normal or operative position, which comprises the zero or lowermost indicating indicia.

Numerous other objects and advantages of the invention will be apparent as it is better understood from the following description, which, when taken in connection with the accompanying drawings, discloses a preferred embodiment thereof.

In the drawings:

Figure 1 is an elevational view of a liquid gauge embodying the features of the instant invention and showing the manner in which the same is connected to a fluid-containing tank for indicating the quantity or height of fluid in the tank;

Fig. 2 is an enlarged rear elevational view of the lower portion of the gauge of Fig. 1; and Fig. 3 is a side elevational view of the gauge with the cover or lower masking member shown in full lines in inoperative or raised position.

Referring more particularly to the drawings, reference numeral 11 indicates in general a liquid gauge which is connectable to any desired tank 12 by means of a pair of suitable conduits 13 and 14, as through a cap member 15. These conduits 13 and 14 may be provided with union fittings 16 intermediate their ends to facilitate installation, the lower end of the conduit 13 being rigidly connected to and communicating with the interior of the cap member 15, and the other conduit 14 passing through a suitable aperture in the cap member 15 in such manner as to prevent leakage therethrough. The lower end of the conduit 14 terminates in an enlarged portion or hollow member 17 having its lower end open to the interior of the tank 12 adjacent the bottom thereof. The lower edge of this enlarged portion 17 preferably rests on the bottom of the tank and is provided with notches or serrations 18 to establish communication between the interiors of the tank and of the member 17.

When the tank 12 is empty, substantially the same pressure exists in conduits 13 and 14, since the enlarged portions 15 and 17 at their lower ends are both subjected to the interior pressure of the tank, which may be atmospheric pressure or greater or less if the tank forms part of a pressure or vacuum system of any sort. Whenever there is any fluid 19 in the tank 12, however, the conduit 14 will be subjected to a pressure equal to that in the conduit 13 plus the head of pressure of such contained fluid. Such pressure differential between conduits 13 and 14 is employed to effect an indicating actuation of the gauge 11 in the same manner as described in the Oyen Patent No. 2,121,743, referred to hereinabove. In this connection, it should be noted that tank 12 corresponds to tanks 14 or 14' of this patent, conduit 13 corresponds to tubes 22 or 23', conduit 14 is similar to tubes 23 or 22', the members 15 and 17 of the instant device are equivalent, respectively, to the branch 17 of T-union 16 or the enlarged concavity 33, and the enlarged concavities 28 or 28' of said patent, and the latter employs reference numerals 15 and 15' to designate the fluid to be measured in the tanks in the same manner as reference numeral 19 is used herein. Consequently, the operation of this portion of the apparatus employed to connect the instant gauge 11 to the tank 12 to measure the quantity or height of the fluid 19 therein will be fully understood from Patent No. 2,121,743, and the instant tank 12 may be of the type having an upstanding filling pipe similar to the tanks of said patent. The gauge 11 disclosed herein, however, differs materially from the U-shaped tubes 10 or 10' of this prior patent.

The instant gauge 11 comprises a supporting frame preferably formed in two parts 21 and 22 of substantially the same width, with the former being disposed in front of the latter and rigidly secured thereto in any suitable manner. As best seen in Fig. 3, the rear frame member 22 extends upwardly above the top end of the front frame member 21 and terminates short of the lower end of the front frame part 21 (Fig. 2). A glass tube 23 is mounted in any suitable manner on the forward surface of the front part 21 of the supporting frame, and the upper end of this tube is connected by means of a union type of fitting 24 (Fig. 1) to the upper end of the conduit 13. Suitable indicating indicia 25 are operatively associated with the transparent tube 23 to cooperate with the upper surface or level of measuring liquid 26 in the tube 23 to indicate the quantity or height of fluid in the tank 12. These indicia 25 may be inscribed upon the outer surface of the glass tube 23 but it is preferred that they be inscribed on the forward surface of the front part 21 of the supporting frame, or upon some other suitable medium attached to the frame. It will be appreciated that the specific character of the indicia 25 will depend upon the type and characteristics of the tank 12 with which the gauge 11 is to be employed, and whether it is desired merely to indicate the height of fluid in the tank or the actual quantity thereof, but such graduation of the indicia is within the realm of anyone skilled in the art and forms no particular part of the instant invention.

The lower end of the glass tube 23 is connected by means of a suitable union fitting 27 (Fig. 2) to one end of a coil of metal conduit 28, which preferably is of substantially less cross-sectional interior area than that of the tube 23 and of the same construction and dimensions as the conduits 13 and 14. The other end of this coil conduit 28 is similarly connected by a union fitting 29 to the lower end of a reserve reservoir or tubular container 31. It is preferred that this tubular container 31 have an interior cross-sectional area at least as great as that of the glass tube 23. The upper end of the container or reservoir 31 in turn is connected, by means of a union fitting 32 similar to the fitting 29, to the lower end of a metal conduit 33 of substantially identical construction as the conduits 13, 14 and 28. This latter conduit 33 extends upwardly along the rear surface of the front part 21 of the supporting frame, the forward surface of the rear part 22 of the frame preferably being provided with a suitable groove to accommodate the conduit, and the upper end of the conduit is removably secured by a union fitting 34 to the upper end of the conduit 14.

As best seen in Figs. 2 and 3, means are provided for supporting the reserve reservoir or tubular container 31 in the frame 21, 22 in such manner as to enable two-way adjustment thereof relative to the glass tube 23. This supporting means comprises an off-set bracket 35 (Fig. 3) having its inner leg secured by means of screws 36 (Fig. 2) to the rear surface of the front part 21 of the frame. The outer leg of this bracket 35 is off-set forwardly and extends laterally beyond the frame member 21. Pivotally mounted on this lateral extension of the bracket 35 by means of a bolt 37 (Fig. 3) is the horizontal leg of a T-fitting or supporting member 38. This horizontal leg of the T-fitting 38 is internally threaded to receive the bolt 37, and the latter extends rearwardly through the bracket 35, so that it may be tightened from the front of the gauge 11 to adjustably secure the T-fitting in any desired angular position. The off-set of the bracket 35 enables the rear portion of the T-fitting 38 to be disposed substantially within the front-to-rear confines of the supporting frame, so that the gauge may be hung or otherwise mounted upon a wall without the T-fitting interferring with the rear surface of the gauge being flush with the wall. The rear leg of the T-fitting 38 slidably embraces the reserve reservoir or tubular container 31, and is provided with a set screw 39 for securing the container in any desired longitudinally adjusted position. Normally, the container 31 is disposed in its position of Fig. 2 with the major portion thereof extending below the T-fitting 38 and the latter secured by the bolt 37 in an intermediate angular position. Only a sufficient quantity of the measuring liquid 26 is provided in the coil of conduit 28 and the lower ends of the glass tube 23 and tubular container 31 to insure that the upper surfaces thereof will be disposed in the tube 23 and container 31, respectively, in the horizontal plane of the axis of the bolt 37 which pivotally supports the T-fitting 38, when the container 31 is in its intermediate position of Fig. 2.

Masking means are provided for covering those portions of the gauge 11 not desired to be seen, and for enhancing the appearance of the gauge, which comprise sheet metal strips 41 having one leg secured to the lateral surfaces of the frame 21, 22 and the other leg bent at right angles thereto and covering a portion of the front surface of the supporting frame. Two such strips 41 are provided, as best seen in Fig. 1, which terminate short of the upper end of the supporting frame. Overlying the latter is a channel-shaped sheet metal masking member 42 which covers the upper end of the glass tube 23 and the fitting 24 connecting the same to the conduit 13. This masking means also includes a cover member 43 disposed at the lower end of the gauge for normally covering the lower end of the glass tube 23 and of the conduit 33 and the coil 28, container 31 and the means for supporting the latter, so as to prevent access thereto. This cover member 43 comprises a circular front wall joined by an annular, marginal flange 44 extending rearwardly therefrom. The upper portion of the front wall of this cover member 43 is cut away vertically for a width equivalent to that of the frame 21, 22 and the thickness of the masking strips 41 (Fig. 1) down to a horizontally disposed edge 45. That portion of the flange 44 normally aligned with this cut-away portion of the front wall of the cover member 43 is bent upwardly at opposite sides of the cut-away portion to provide vertically extending ears 46 disposed in opposing relationship to each other and forming means for mounting the cover member on the gauge frame. Suitable screws 47 are employed to secure these ears 46 of the cover member 43 to the lateral edges of the gauge-supporting frame in such position that the horizontal edge 45 of the cut-away portion of the front wall of the cover member is disposed in the horizontal plane of the axis of the bolt 37. This horizontal edge 45 also comprises the lowermost or zero mark of the indicating indicia 25 when the cover member 43 is in its operative position. Thus, as will be seen from Fig. 1, this masking means, and particularly the cover member 43, greatly facilitates reading of the gauge 11, and since a bright color preferably is given the measuring liquid 26, the approach of the upper or measuring surface thereof in the tube 23 toward the horizontal edge 45 of the cover member 43 will be easily apparent from a considerable distance away from the gauge. Whenever it is desired to adjust the position of the reserve reservoir or tubular container 31, it is necessary only to remove two of the oppositely disposed screws 47, there being two such screws extending through each of the attaching ears 46, and raise the cover member from its normal position of Figs. 1 and 2 to its inoperative, full line position of Fig. 3. With the cover member 43 so raised to its inoperative position, ready access may be had to the bolt 37 and the set screw 39 from the front of the gauge, so that desired adjustments of the tubular container 31 may be effected without removing the gauge from the wall or other supporting structure.

As previously noted, when the gauge 11 is manufactured, the reserve reservoir or tubular container 31 will be disposed in an intermediate position, such as that illustrated in Fig. 2, and measuring liquid 26 is placed therein, with the gauge 11 in its normal vertical position, in such quantity as to fill the intermediate coil of conduit 28 and bring the surfaces of the measuring liquid in the lower portions of the glass tube 23 and the container 31 coincident with, or in the horizontal plane of, the pivotal axis of the bolt 37 and the zero or lowermost of the indicating indicia 25, comprising the edge 45 of the cover member 43 when the latter is in its operative position of Figs. 1 and 2. Consequently, variations that may be incurred in different installations, which would require addition or subtraction of different quantities of measuring fluid to the U-shaped tubes 10 or 10' of Patent No. 2,121,743, may readily be compensated for with the instant gauge 11 merely by adjusting the reservoir or tubular container 31 from its normal position of Fig. 2. This may be accomplished without removing the gauge 11 from its installed position; it being necessary only to remove two of the opposed screws 47, swing the cover member upwardly to its inoperative or full line position of Fig. 3, loosen either or both the bolt 37 or screw 39, adjust the container if necessary, re-tighten the loosened holding members 37 and 39, and replace the cover 43 in its normal position.

As will best be appreciated from Fig. 2, if the container 31 is swung clockwise about its pivot 37 from its normal position to a vertical position, for example, and then raised or slid upwardly in the T-fitting 38, the surfaces of the measuring liquid 26 will be raised proportionately to such movement, both in the container and in the glass tube 23, from their original horizontal plane passing through the axis of bolt 37. This can be better visualized, perhaps, if the U-shaped tube 10 of Patent No. 2,121,743 be construed as flexible and the effect be considered of lifting one leg thereof while maintaining the other stationary. In both cases, this effect is to reduce the volume or space in the container available for the given quantity of measuring liquid which normally is disposed below the stationary datum line, comprising the horizontal plane through the axis of bolt 37 in the instant device. Such adjustment of container 31 is permitted in this gauge 11 by virtue of the flexibility of the conduits 28 and 33. Likewise, such swinging of the container 31 to a vertical position and lowering thereof in the T-fitting 38 will lower the indicating surface of measuring liquid 26 in the tube 23 relative to the fixed indicia 45. These two examples of possible adjustments of container 31 will effect extreme variations in the position of the indicating surface of liquid 26 in the tube 23. Lesser variations may be accomplished by slidably adjusting container 31 relative to T-fitting 38 in its angular position of Fig. 2, and extremely fine adjustments of the measuring liquid level may be made by merely swinging the container angularly about its pivot bolt 37 without changing its position relative to the T-fitting 38.

For example, after installation and use of the gauge 11 with the tank 12 for measuring gasoline contained therein, the same gauge may be employed to indicate the varying quantities of heavier fluid in the tank 12, such as oil, if it is desired thereafter to use the same tank for storing the latter. In other words, with the same installation and the tank 12 filled with oil, the indicating surface of the measuring liquid 26 will be at a higher level in the tube 23 than it would be if the tank were filled with gasoline. This is because the difference between the pressures existing in the conduits 13 and 14 will be greater due to the oil having a higher specific gravity than the gasoline. Consequently, the container 31 may be adjusted, from the position in which it was set when gasoline was being measured, in order to cause the "full tank" indicating position of the surface of the measuring liquid 26 to be at the same point in the tube 23 when oil is being measured, by swinging the container clockwise from its former position about the pivot bolt 37. If the difference in specific gravities of the different liquids being measured were greater, the necessary additional variation of the position of the indicating surface of measuring liquid 26 could be effected by slidably adjusting container 31 relative to the T-fitting 38. In any case, the desired change of position of the indicating surface of the measuring fluid 26 in the tube 23 may be effected merely by adjusting the position of the auxiliary reservoir or tubular container 31, and the necessity of adding measuring liquid to the gauge or removing part of that therein during or after installation of the gauge, together with the obvious attendant disadvantages of such prior procedure, are all completely eliminated. It will be understood, of course, that such conversion of any given installation for use with another liquid having a specific gravity different from that of the liquid previously handled in that installation will require the substitution of a different set of indicia 25 for that previously employed, as also will be the case where it is desired to indicate the capacity or contents of the tank in gallons rather than showing only the height of the tank's contents in feet or inches. So far as the latter type of indication is concerned, the same gauge 11 with the same indicia 25 will give identical readings with different tanks having the same vertical dimension but different lengths, widths or vertical cross sections. As noted hereinbefore, however, the specific character of the indicating indicia 25 forms no part of the instant invention.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A gauge for indicating the quantity of fluid in a tank, comprising a transparent tube having indicating indicia associated therewith and connected at its upper end with the tank, a tubular container connected at one end to the tank and connected at its other end by a relatively flexible conduit to the lower end of said tube, a predetermined quantity of measuring liquid disposed in said flexible conduit, said container and the lower portion of said tube, and a member pivotally mounted adjacent the lower portion of said tube and slidably engaging said container intermediate its ends for adjustably supporting said container for pivotal and sliding movement to enable selective positioning of the container relative to the tube to vary the level of the predetermined quantity of measuring liquid in the latter relative to said indicating indicia.

2. In a liquid gauge for indicating the quantity of liquid in a tank and having a transparent tube with its upper end connected to said tank and fixed indicia associated therewith for indicating variations of the height of a given quantity of measuring liquid therein, a frame structure for supporting said tube, a reservoir for said measuring liquid flexibly interconnected between the lower end of said tube and said tank, a reservoir-supporting bracket mounted on said frame and adjustably engaging said reservoir to enable variable positioning thereof relative to said tube to selectively vary the height of the measuring liquid in the tube relative to said fixed indicia without changing said given quantity of measuring liquid, and a cover member pivotally mounted on the lower portion of said frame for movement between an inoperative position to facilitate variable positioning of said reservoir and an operative position covering the latter and the lower end of said tube, said cover member having a cut-away portion in one wall thereof defining a horizontal edge comprising the lowermost said indicating indicia when the cover member is in its operative position.

3. A gauge for indicating the quantity of fluid in a tank, comprising a frame member, a transparent tube fixedly mounted on the forward surface of said frame member and having indicating indicia associated therewith, the upper end of said tube being connected to said tank, a tubular container having at least as great an interior cross-sectional area as that of said tube; supporting means, comprising a bracket secured to the rear portion of said frame member adjacent the lower end thereof, a supporting member slidably and adjustably engaging said tubular container intermediate its ends, and adjustable means for pivotally securing said supporting member to said bracket on an axis disposed substantially in a horizontal plane passing through the lowermost said indicating indicia; a coil of metal conduit interconnecting the lower ends of said tube and said container and having a smaller interior cross-sectional area than that of said tube, a second conduit having cross-sectional dimensions similar to those of said coil connected at one end to the upper end of said container and connected at its other end to said tank, and masking means mounted on said frame member for covering the upper and lower ends of said tube and preventing said coil, said container and said supporting means from being seen from the front of the gauge.

4. A gauge according to claim 3, wherein said masking means includes a cover member pivotally mounted on the lower portion of the frame member, for movement between an inoperative position to facilitate adjustment of the container and an operative position, and having a cut-away portion in the front wall thereof defining a horizontal edge comprising the lowermost said indicating indicia when the cover member is in such operative position.

HARRY L. COLEMAN.

REFERENCES CITED

The following references are of record in the file of this patent:

UNITED STATES PATENTS

| Number | Name | Date |
| --- | --- | --- |
| 1,330,047 | Alexander et al. | Feb. 10, 1920 |
| 1,894,366 | Cantacuzene | Jan. 17, 1933 |
| 2,266,955 | Borden | Dec. 23, 1941 |

FOREIGN PATENTS

| Number | Country | Date |
| --- | --- | --- |
| 249,743 | Germany | July 27, 1912 |